US010333574B2

(12) United States Patent
Baghel et al.

(10) Patent No.: US 10,333,574 B2
(45) Date of Patent: Jun. 25, 2019

(54) WIRELESS RESOURCE ALLOCATION FOR A VEHICLE ACTING AS A BASE STATION

(71) Applicant: QUALCOMM Incorporated, San Diego, CA (US)

(72) Inventors: Sudhir Kumar Baghel, Hillsborough, NJ (US); Shailesh Patil, Raritan, NJ (US); Junyi Li, Chester, NJ (US); Kapil Gulati, Dover, DE (US); Georgios Tsirtsis, London (GB); Zhibin Wu, Bedminster, NJ (US); Tien Viet Nguyen, Bridgewater, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/621,456

(22) Filed: Jun. 13, 2017

(65) Prior Publication Data

US 2018/0076839 A1    Mar. 15, 2018

Related U.S. Application Data

(60) Provisional application No. 62/395,320, filed on Sep. 15, 2016.

(51) Int. Cl.
*H04W 64/00* (2009.01)
*H04W 72/04* (2009.01)
(Continued)

(52) U.S. Cl.
CPC ............ *H04B 1/3822* (2013.01); *H04W 4/90* (2018.02); *H04W 28/26* (2013.01); *H04W 40/22* (2013.01);
(Continued)

(58) Field of Classification Search
CPC ..... H04W 36/00; H04W 36/16; H04W 36/10; H04W 40/00; H04W 72/04; H04W 76/00; H04W 64/00; H04W 40/20
See application file for complete search history.

(56) References Cited

U.S. PATENT DOCUMENTS 9,913,095 B2 * 3/2018 Talluri ................ H04W 4/025
2014/0274064 A1    9/2014 Al-Shalash et al.
(Continued)

FOREIGN PATENT DOCUMENTS

WO    WO-2012070045 A2    5/2012
WO    WO-2012089237 A1    7/2012

OTHER PUBLICATIONS

International Search Report and Written Opinion—PCT/US2017/049965—ISA/EPO—dated Nov. 23, 2017.

*Primary Examiner* — Blane J Jackson
(74) *Attorney, Agent, or Firm* — Loza & Loza, LLP

(57) ABSTRACT

Aspects of the disclosure relate to a vehicle, or a device or system connected to the vehicle, that enables the vehicle to act as a base station in a wireless communication network. The vehicle includes an access interface transceiver configured to communicate with devices within its passenger cabin, and a backhaul interface transceiver configured to communicate with the wireless communication network. By acting as a base station, the vehicle can establish and provide connectivity between the devices in its passenger cabin and the wireless communication network via the access transceiver and backhaul transceiver.

27 Claims, 8 Drawing Sheets

(51) Int. Cl.
| | |
|---|---|
| *H04W 40/20* | (2009.01) |
| *H04B 1/3822* | (2015.01) |
| *H04W 76/20* | (2018.01) |
| *H04W 4/90* | (2018.01) |
| *H04W 76/10* | (2018.01) |
| *H04W 40/22* | (2009.01) |
| *H04W 52/28* | (2009.01) |
| *H04W 84/00* | (2009.01) |
| *H04W 84/04* | (2009.01) |
| *H04W 28/26* | (2009.01) |
| *H04W 92/20* | (2009.01) |
| *H04W 28/02* | (2009.01) |

(52) U.S. Cl.
CPC ......... *H04W 52/283* (2013.01); *H04W 76/10* (2018.02); *H04W 76/20* (2018.02); *H04W 84/005* (2013.01); *H04W 84/045* (2013.01); *H04W 28/0226* (2013.01); *H04W 92/20* (2013.01)

(56) References Cited

U.S. PATENT DOCUMENTS

| | | | |
|---|---|---|---|
| 2015/0312824 A1* | 10/2015 | Thalanany | H04W 36/165 455/435.1 |
| 2015/0334750 A1* | 11/2015 | Mehta | H04W 76/10 370/329 |
| 2016/0165548 A1* | 6/2016 | Mohlmann | H04B 7/15535 455/522 |
| 2016/0323796 A1* | 11/2016 | Richter | H04W 36/32 |
| 2017/0208508 A1* | 7/2017 | Laraqui | H04W 36/0016 |

* cited by examiner

WIRELESS RESOURCE ALLOCATION FOR A VEHICLE ACTING AS A BASE STATION

PRIORITY CLAIM

This application claims priority to and the benefit of Provisional Patent Application No. 62/395,320 filed in the U.S. Patent and Trademark Office on Sep. 15, 2016, the entire content of which is incorporated herein by reference as if fully set forth below in its entirety and for all applicable purposes.

TECHNICAL FIELD

The technology discussed below relates generally to wireless communication systems, and more particularly, to motor vehicles equipped with wireless systems to act as a base station. Embodiments can provide and enable techniques for allocating wireless resources to the vehicle and to devices within its passenger cabin.

INTRODUCTION

When a smartphone or other wireless communication device is used from within the passenger cabin of a motor vehicle, its performance and user experience may suffer due to penetration loss of the signal as it penetrates the walls or ceiling of the passenger cabin. Furthermore, when many such mobile devices are operating from within motor vehicles on a crowded roadway, the potentially high-power transmissions from all those devices can create excessive interference to other signals or links in their proximity.

These and other issues make it clear that there remains substantial room for improvement of the quality of wireless communications for passengers within motor vehicles.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a vehicle, or a device or system connected to the vehicle, that enables the vehicle to act as a base station in a wireless communication network. The vehicle includes an access interface transceiver configured to communicate with devices within its passenger cabin, and a backhaul interface transceiver configured to communicate with the wireless communication network. By acting as a base station, the vehicle can establish and provide connectivity between the devices in its passenger cabin and the wireless communication network via the access transceiver and backhaul transceiver.

In one aspect of the disclosure, a method for wireless communication in a wireless communication network is provided. The method includes communicating with a set of one or more wireless communication devices within a passenger cabin of a vehicle via an access transceiver coupled to the vehicle. The method further includes communicating with the wireless communication network outside the passenger cabin of the vehicle via a backhaul transceiver coupled to the vehicle, and establishing connectivity between the set of one or more wireless communication devices and the wireless communication network via the access transceiver and the backhaul transceiver.

Another aspect of the disclosure provides an apparatus coupled to a vehicle and configured to act as a base station in a wireless communication network. The apparatus includes a processor, an access transceiver communicatively coupled to the processor, and configured for wireless communication with a set of one or more wireless communication devices within a passenger cabin of the vehicle, and a backhaul transceiver communicatively coupled to the processor, and configured for wireless communication with the wireless communication network outside the passenger cabin of the vehicle. The processor is further configured to establish connectivity between the set of one or more wireless communication devices and the wireless communication network via the access transceiver and the backhaul transceiver.

Another aspect of the disclosure provides an apparatus in a wireless communication network. The apparatus includes means for communicating with a set of one or more wireless communication devices within a passenger cabin of a vehicle, means for communicating with the wireless communication network outside the passenger cabin of the vehicle, and means for establishing connectivity between the set of one or more wireless communication devices and the wireless communication network via the means for communicating with the set of one or more wireless communication devices and the means for communicating with the wireless communication network.

Examples of additional aspects of the disclosure follow. In some aspects of the present disclosure, a position of the vehicle, a speed of the vehicle, and a trajectory of the vehicle, along with a planned route of the vehicle may be determined, and information about the position, speed, trajectory, and planned route of the vehicle may be transmitted to the wireless communication network via the backhaul transceiver. An allocation of wireless resources may then be received based in part on the position, speed, trajectory, and planned route of the vehicle. In some examples, a positioning device may determine the position, speed, and trajectory of the vehicle. In some examples, a navigation device may determine the planned route of the vehicle.

In some aspects of the present disclosure, a location of a neighbor vehicle, a speed of the neighbor vehicle, and a trajectory of the neighbor vehicle may be determined, and information about the position, speed, and trajectory of the neighbor vehicle may be transmitted to the wireless communication network via the backhaul transceiver. An allocation of wireless resources may then be received based in part on the position, speed, and trajectory of the neighbor vehicle. In some examples, a set of one or more sensors may determine the location, speed, and trajectory of the neighbor vehicle. In some examples, a vehicle-to-vehicle (V2V) communication system may determine the location, speed, and trajectory of the neighbor vehicle.

In some aspects of the present disclosure, a set of one or more parameters of an environment in the passenger cabin that affects performance of the access transceiver may be determined, and information about the set of one or more parameters may be transmitted to the wireless communication network via the backhaul transceiver. An allocation of wireless resources may then be received based in part on the set of one or more parameters.

In some aspects of the present disclosure, an identity of a user equipment (UE) among the set of one or more wireless communication devices may be determined, and information about the identity of the UE may be transmitted to the wireless communication network via the backhaul transceiver. A radio network temporary identifier (RNTI) for the UE may then be received from the wireless communication network via the backhaul transceiver and transmitted to the UE via the access transceiver.

In some aspects of the present disclosure, a request for resources to the wireless communication network may be transmitted via the backhaul interface, and an allocation of resources may then be received from the wireless communication network via the backhaul interface. Access interface resources may then be determined from among the allocation of resources for a user equipment (UE) among the set of one or more wireless communication devices, and scheduling information based on the access interface resources may be transmitted to the UE via the access interface. In some aspects of the present disclosure, the allocation of resources includes the access interface resources and backhaul resources, the backhaul transceiver is configured to communicate with the wireless communication network utilizing the backhaul resources, and the access transceiver is configured to communicate with the UE utilizing the access interface resources. In some examples, the access interface resources and the backhaul resources include a same frequency. In some examples, the access interface resources and the backhaul resources include carrier frequencies above 6 GHz.

In some aspects of the present disclosure, the request for resources may be transmitted utilizing a radio network temporary identifier (RNTI) of the vehicle, and the allocation of resources may be received for the RNTI of the vehicle. The access interface resources within the allocation of resources may then be scheduled for the UE.

In some aspects of the present disclosure, the request for resources may be transmitted utilizing at least a radio network temporary identifier (RNTI) of the UE, and the access interface resources may be received for the RNTI of the UE.

In some aspects of the present disclosure, the access interface resources are simultaneously allocated to another vehicle within the wireless communication network. In some aspects of the present disclosure, the backhaul transceiver is configured for wireless communication at a higher power than the access transceiver.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
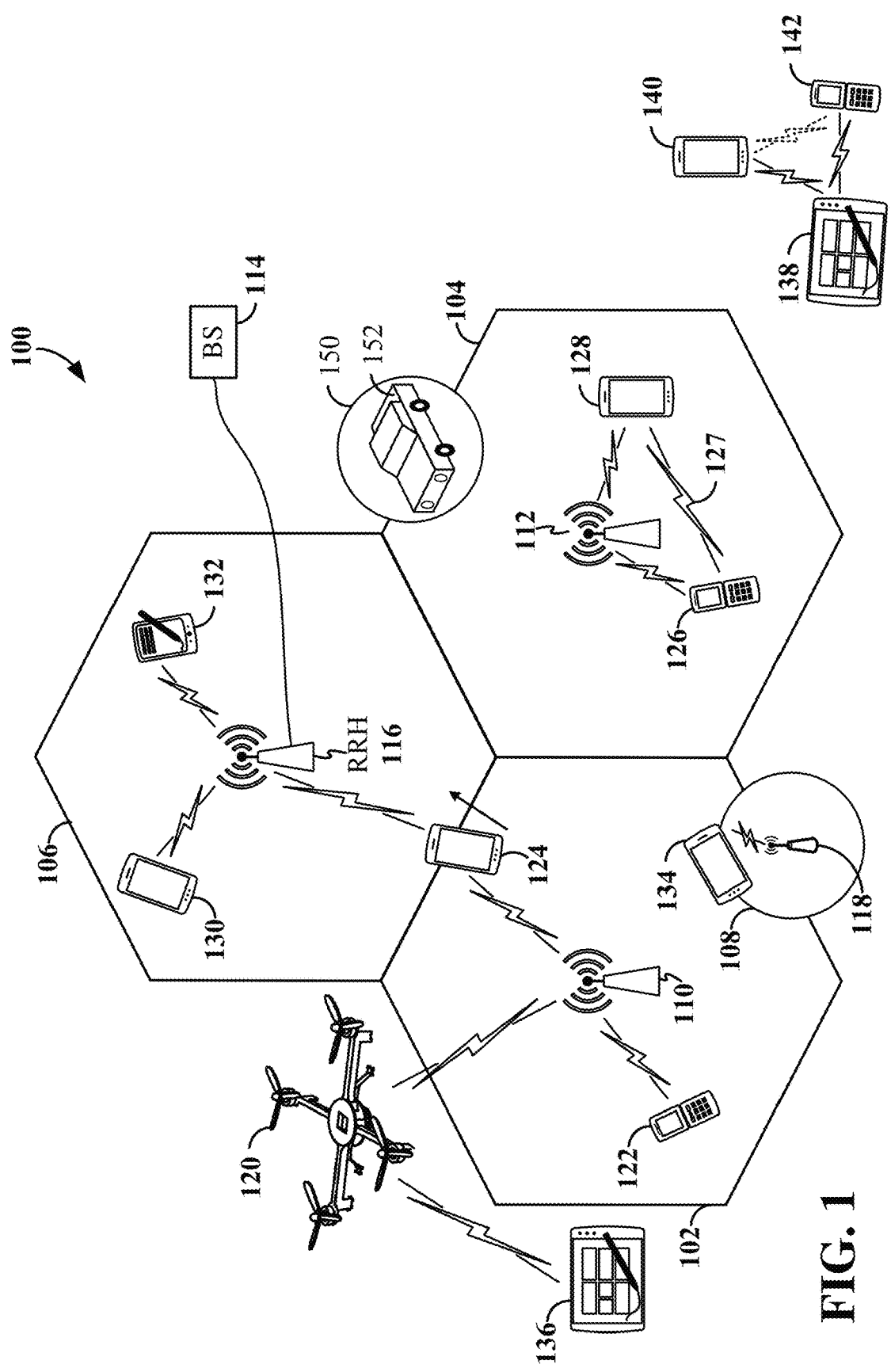
FIG. 1 is a conceptual diagram illustrating an example of a radio access network, according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of a radio access network 100 is provided. The radio access network (RAN) 100 may be a legacy RAN or a next generation RAN. In addition, one or more nodes in the RAN 100 may be next generation nodes or legacy nodes.

As used herein, the term legacy RAN refers to a RAN employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE).

Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation RAN refers to a RAN employing a fifth generation (5G) wireless communication technology based on a set of standards that complies with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. An example of a next generation RAN includes the New Radio (NR) RAN.

The geographic region covered by the RAN 100 may be divided into a number of cellular regions (cells) that can be uniquely identified by a user equipment (UE) based on an identification broadcasted over a geographical from one access point or base station. FIG. 1 illustrates macrocells 102, 104, and 106, and small cells 108 and 150, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology. In some examples, a base station may be a road side unit (RSU). That is, an RSU may be a stationary infrastructure entity that combines the functions of an eNB or gNB with the application logic for vehicle communication.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the RAN 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks. As one example, the small cell 150, provided by a vehicle 152, may function as an IAB node.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a road side unit (RSU), (i.e., an RSU may be a logical entity that combines the functionality of a UE with the application logic for vehicle communication), a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
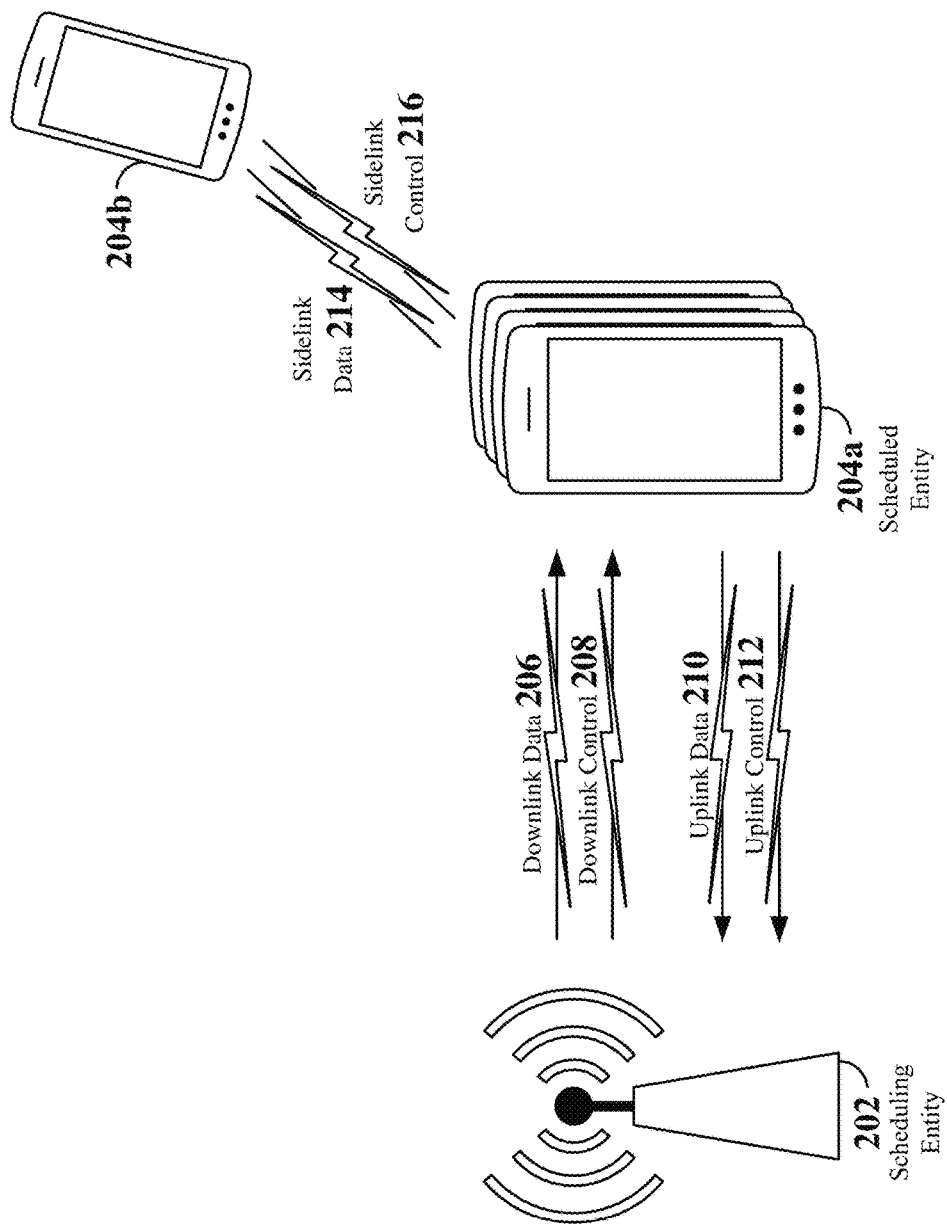
FIG. 2 is a block diagram conceptually illustrating an example of a scheduling entity communicating with one or more scheduled entities, according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, the vehicle 152, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink user data traffic 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS (e.g., handshake) may enable different scheduled entities performing sidelink communications to negotiate the availability of the sidelink channel prior to communication of the sidelink user data traffic 214. The PSHICH may include HARQ acknowledgment information and/or a HARQ indicator from a destination device, so that the destination may acknowledge traffic received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
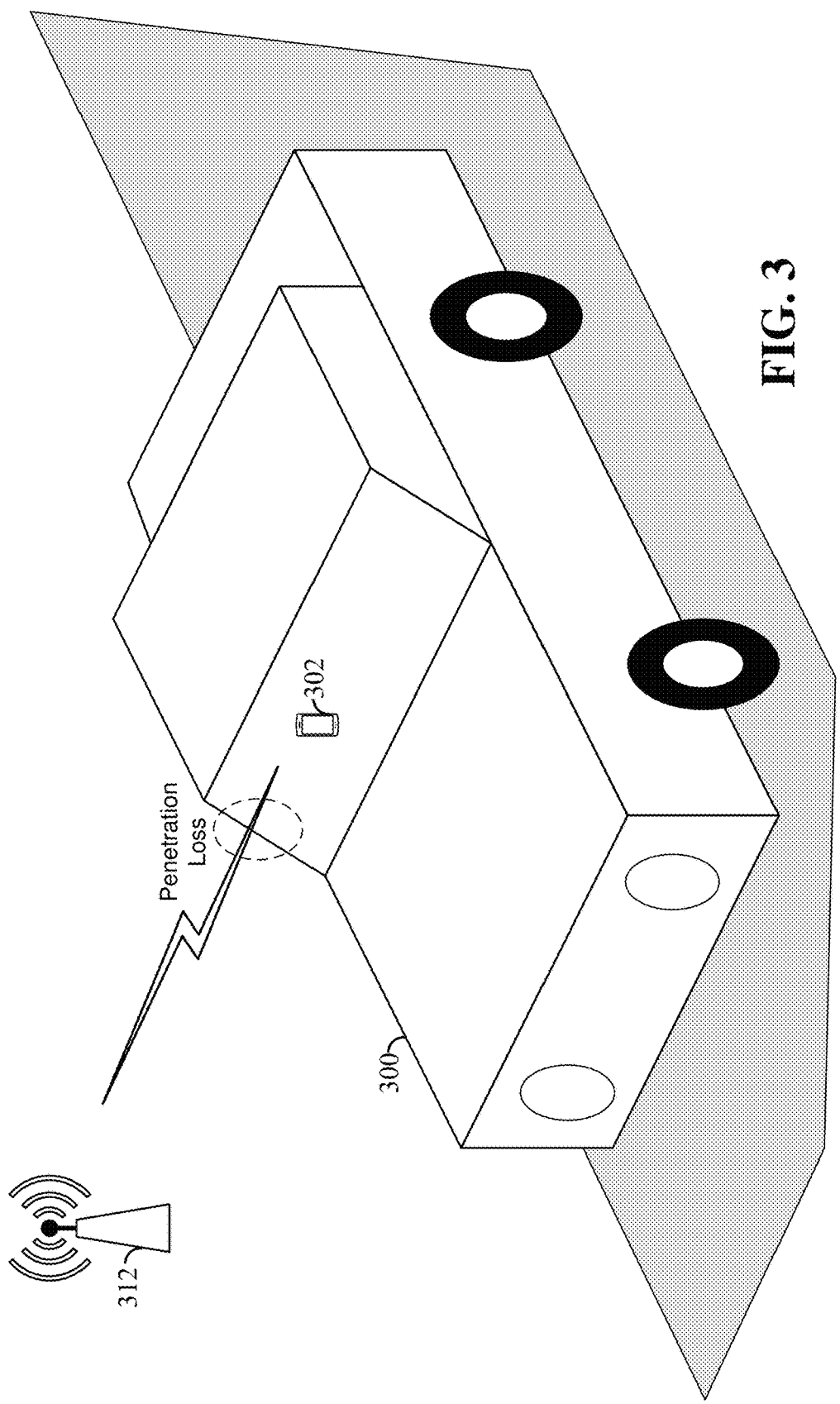
FIG. 3 is a simple illustration of a conventional motor vehicle with a wireless communication device inside its passenger cabin.

FIG. 3 is a simple illustration of a conventional motor vehicle 300 showing a UE inside its passenger cabin. In this illustration, the vehicle 300 is within the service area or cell of a base station 312. When a user utilizes their handheld smartphone or UE 302 from within the vehicle's passenger cabin, their user experience may suffer due to penetration loss of the signal as it passes through the walls or ceiling of the passenger cabin. Signal attenuation may be even more problematic in 5G wireless communication networks that utilize carrier frequencies above 6 GHz.

Therefore, in various aspects of the disclosure, as mentioned above in relation to FIGS. 1 and 2, a motor vehicle may be equipped with advanced antenna systems, enabling the vehicle to function as a scheduling entity 202 and/or a scheduled entity 204 within a wireless communication system.

Figure 4:
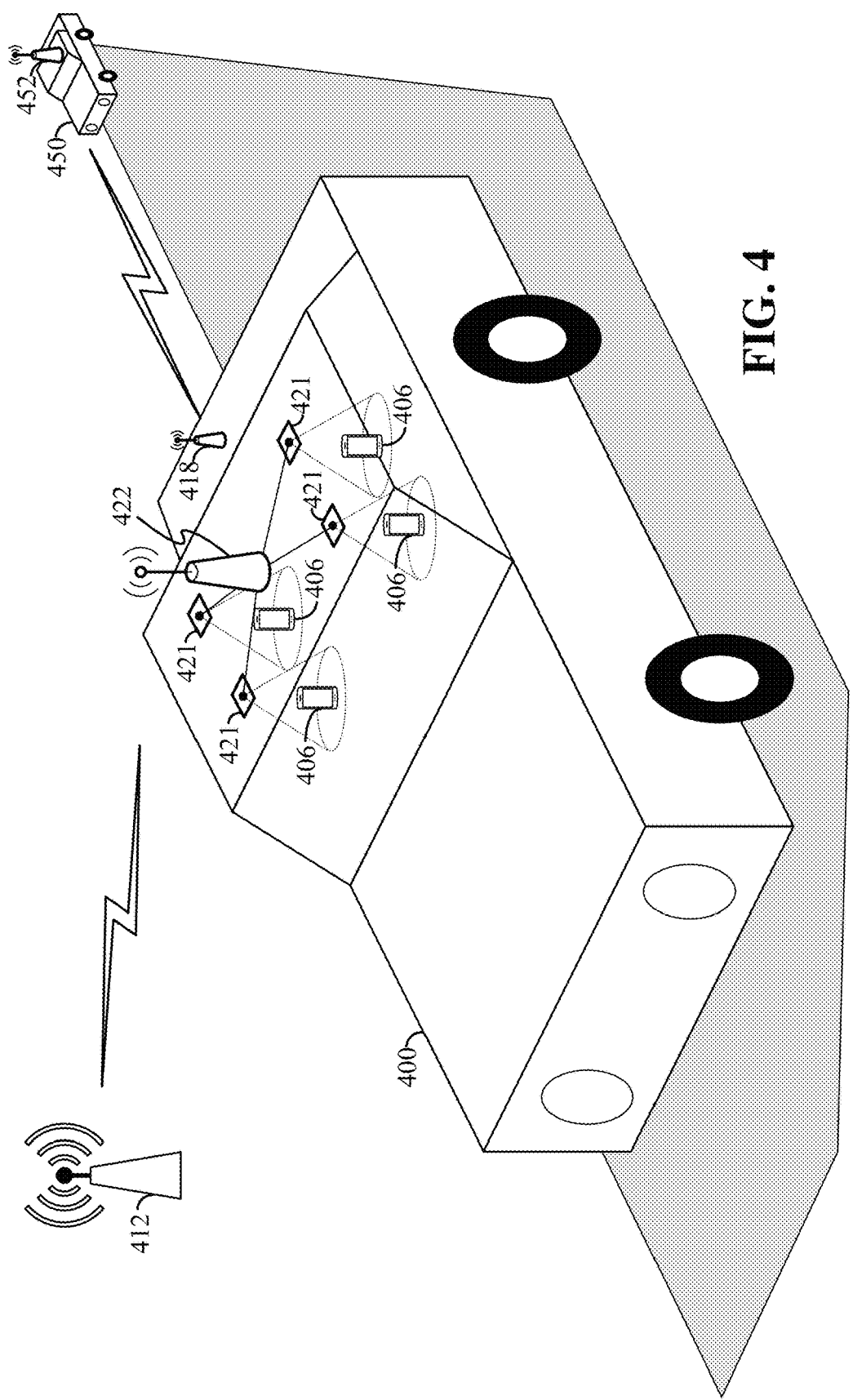
FIG. 4 is a simplified schematic illustration of a motor vehicle according to an aspect of the present disclosure, equipped to act as a base station in a wireless communication network, according to some aspects of the present disclosure.

FIG. 4 provides a simplified schematic illustration of a motor vehicle 400 according to an aspect of the present disclosure, including one example of such an antenna/communication system. For example, the vehicle 400 may include a backhaul transceiver 422 configured to provide a backhaul link or backhaul interface between the vehicle 400 and one or more scheduling entities or base stations 412. Of course, while the simplified illustration of FIG. 4 shows the backhaul transceiver 422 including a single antenna extending out from the top of the roof of the vehicle (e.g., externally located on the roof of the vehicle), it is to be understood that any suitable antenna or set of antennas, at any suitable location, may be utilized in a particular implementation of a backhaul transceiver. For example, a motor vehicle may include an array of antennas suitably located and controlled to enable beamforming and/or to support multiple-input-multiple-output (MIMO) communications between the backhaul transceiver 422 and the base station 412. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

Broadly, the nature of the backhaul link or backhaul interface may take a variety of forms. In some examples, the backhaul connection may act to provide functionality within the wireless network that includes the base station 412 such that the vehicle 400 may act as a UE. In other examples, the backhaul connection may act to provide functionality within the wireless network such that the vehicle 400 may act as a small cell, providing connectivity to the wireless communication network for one or more UEs 406 within the passenger cabin of the vehicle 400 or otherwise in the vicinity of the vehicle 400.

Further, the vehicle 400 may include an access transceiver 421 configured to provide an access link or access interface between the vehicle 400 and one or more UEs 406. The illustration in FIG. 4 provides four such access transceivers 421 or antennas located under the roof of the passenger cabin, but it is to be understood that any number of one or more access transceivers or antennas may be provided on or in a vehicle 400. In some examples, the same physical circuitry and even antennas may operate as the access transceiver 421 and the backhaul transceiver 422. In other examples, including the illustrated example of FIG. 4, one or more access transceivers 421 may be communicatively coupled (e.g., via a suitable wired connection) to the backhaul transceiver 422.

The nature of the access link or access interface may also take a variety of forms. In some examples, the access link may act to provide access to a wireless communication network for one or more UEs in the passenger cabin or otherwise in the vicinity of the vehicle 400. The communication protocol utilized by the access interface may in some examples be the same communication protocol as that used by the backhaul interface. For example, the communication protocol may include a 5G wireless network communication protocol, such as the New Radio (NR) communication protocol. In various aspects of the present disclosure, the NR communication protocol may utilize a carrier frequency above 6 GHz. In other examples, the communication protocol utilized by the access interface may be a first protocol (e.g., Wi-Fi) while the communication protocol utilized by the backhaul interface may be a second protocol (e.g., a legacy or next generation cellular network communication protocol).

In some examples, the access transceiver 421 and backhaul transceiver 422 may utilize the same carrier frequency or different carrier frequencies. In addition, the access transceiver 421 and backhaul transceiver 422 may be configured to utilize the same time-frequency resources for communication with the base station 412 and communication with the UEs 406. To enable the backhaul transceiver 422 and access transceiver 421 to utilize the same carrier frequency (and possibly the same time-frequency resources), the backhaul transceiver 422 may be shielded from the access transceiver 421. For example, the antenna(s) of the backhaul transceiver 422 may be configured externally on a roof of the vehicle, while the antenna(s) of the access transceiver 421 may be configured within the passenger cabin of the vehicle and/or under the roof of the vehicle, as illustrated in FIG. 4.

In one particular example, the backhaul transceiver 422 and the access transceiver 421 may be configured to enable the vehicle 400 to provide a small cell in a wireless communication network. For example, with reference to FIG. 1, the vehicle 400 may function as a low-power base station 118 providing a small cell 108. In another example, the vehicle 400 may function as an Integrated Access-Backhaul (IAB) node. As described above in relation to FIGS. 1 and 3, an IAB node may utilize the wireless spectrum for the same radio access technology (RAT) for both the access links (e.g., with one or more UEs in its passenger cabin) and for the backhaul link (e.g., with one or more remote base stations or scheduling entities).

That is, according to an aspect of the present disclosure, vehicle penetration loss, especially at frequencies above 6 GHz, may be reduced or mitigated by deploying a backhaul transceiver, or its one or more antennas, at the roof of vehicle for backhaul communication with base station, and an access transceiver, or its one or more antennas, inside of the vehicle for an access link to communicate with UEs inside the vehicle 400. In this way, the access link can utilize relatively low power communication, as the UEs 406 are in close proximity to the access transceiver 421 without significant obstacles or barriers between them. Thus, the access transceiver 421 may be configured for wireless communication at a lower power than the backhaul transceiver 422. Furthermore, because the access transceiver 421 and/or its antenna is inside the vehicle 400, interference caused by this access link outside of the car may be minimal, and may further be reduced by utilizing low power.

In a further aspect of the disclosure, this configuration may enable the base station 412 (or any suitable network node in the wireless communication network that includes the base station 412) to act as centralized resource management entity to manage resources for the backhaul link and resources for the access link. In some examples, the vehicle 400, via the backhaul transceiver 422, may provide an identity of one or more UEs 406 connected to the access transceiver 421 to the base station 412, and may set up or establish a connection between the one or more UEs 406 and the base station 412 via the access transceiver 421 and the backhaul transceiver 422 The base station 412 may then provide a radio network temporary identifier (RNTI) for each of the one or more UEs 406 to the vehicle 400 via the backhaul transceiver 422. The received RNTIs may be transmitted to each of the respective UEs 406 via the access transceiver 421. In addition, in some examples, the base station 412 may configure the vehicle 400 with an RNTI for communication between the base station 412 and the backhaul transceiver 422.

The vehicle 400 may determine whether there is a need for wireless resources for the access network and/or for the backhaul network. Such a need for resources may arise when a UE 406 indicates a request to initiate a new call or data session, to increase its usage corresponding to an existing call or data session, to transmit a scheduling request or random access request, or for any other suitable reason. If such a need arises, the vehicle 400 may transmit a request for resources for the access link and the backhaul link from the base station 412. The request may be transmitted via the backhaul transceiver, and may include suitable control signaling including, but not limited to, a scheduling request. In some examples, the request for resources may be transmitted utilizing the RNTI of the vehicle. In other examples, the request for resources may be transmitted utilizing the RNTI of the requesting UE.

The vehicle 400 may further receive control information including an allocation of resources for both the backhaul interface and the access interface from the base station 412 via the backhaul transceiver 422. The control information may be carried, for example, in a downlink control channel (e.g., the PDCCH), configured to be received by the vehicle 400 via the backhaul transceiver 422. In some examples, the control information may include backhaul downlink resources for receiving user data traffic from the base station 412 via the backhaul transceiver 422 and access downlink resources for transmitting the user data traffic from the vehicle 400 to the UE 406 via the access transceiver 421. In other examples, the control information may include access uplink resources for transmitting user data traffic from the UE 406 to the vehicle 400 via the access transceiver 421 and backhaul uplink resources for transmitting the user data traffic from the vehicle 400 to the base station 412 via the backhaul transceiver 422.

In some examples, the control information for the backhaul resources may be addressed to the vehicle 400 based on the RNTI of the vehicle, while the access resources may addressed to the UE 406 based on the RNTI of the UE 406. For example, the backhaul control information may be scrambled with the RNTI of the vehicle, while the access control information may be scrambled with the RNTI of the UE.

In some examples, the backhaul interface resources and the access interface resources may utilize the same time-frequency resources. In this example, the backhaul and access interface resources may be signaled collectively within combined control information scrambled using the RNTI of the vehicle. In other examples, the backhaul interface resources may be different than the access interface resources. Upon extracting the access interface resources from the access control information, the vehicle 400 may then transmit scheduling information including the access interface resources to the UE 406.

In other examples, the control information for both the backhaul and access resources may be addressed to the vehicle 400 based on the RNTI of the vehicle 400. For example, the control information may be scrambled with the RNTI of the vehicle 400. In this example, the control information may include resource allocations (backhaul and access interface) for more than one UE 406 within the vehicle. The vehicle 400 may then determine the access interface resources and the backhaul interface resources from among the allocation of resources. In some examples, the backhaul interface resources and the access interface resources may utilize the same time-frequency resources. In other examples, the backhaul interface resources may be different than the access interface resources. In some examples, the vehicle may receive semi-static information (e.g., via radio resource control (RRC) signaling) indicating the subcarriers or tones that may be allocated to each of the interfaces. In other examples, the control information may include information identifying the backhaul resources and the access resources.

In addition, if the resource allocation is for more than one UE 406, the vehicle 400 may further schedule the access interface resources between the UEs 406 and transmit respective scheduling information, each including separate access interface resources (e.g., different time-frequency resources), to the UEs 406. In other examples, the control information indicating the allocation of resources may include any suitable information identifying the particular access interface resources allocated to each of the UEs in the passenger cabin of the vehicle 400. For example, the access interface resource allocation may at least in part be addressed directly to each respective UE in the passenger cabin of the vehicle 400 based on the RNTI of that UE.

According to an aspect of the present disclosure, the base station 412 may re-use those same access interface resources at one or more other locations. At those other locations, those same access interface resources may be operable as an access link for UEs inside another vehicle (e.g., within vehicle 450), and/or as a backhaul link for another vehicle (e.g., for vehicle 450). In some examples, more than one re-use may be performed by the base station 412, e.g., three or four access links and one backhaul link may all use the same resources.

For example, the base station 412 may be aware of various vehicle information related to the vehicle 400, such as the location, speed, trajectory, and planned route of the vehicle 400. In addition, the base station 412 may be aware of vehicle information related to a set of one or more other vehicles (e.g., vehicle 450). For example, the base station 412 may receive vehicle information from one or more vehicles and/or may communicate with other base stations to receive vehicle information on other vehicles in the vicinity of the vehicle 400. Furthermore, the base station 412 may be aware of the dynamic environment of the access link, such as a condition where all the windows are rolled down in the vehicle 400, which may increase the amount of interference caused by UEs in the passenger cabin of the vehicle 400 to other UEs outside the vehicle 400.

The base station 412 may utilize the vehicle information, including the dynamic environment information, received from vehicle 400, other vehicles, and other base stations to allocate backhaul and access interface resources to the vehicle 400. For example, if the base station 412 determines that based on the positional relation of the vehicle 400 and another vehicle (e.g., vehicle 450) and/or the dynamic environment of the vehicle 400, a high amount of interference may result if resources are re-used between vehicles (e.g., between vehicles 400 and 450), the base station 412 may determine not to re-use the resources utilized by the access link in the vehicle 400 within vehicle 450, or only to re-use those resources at a suitable distance from the vehicle 400 (e.g., within another vehicle at a larger distance from vehicle 400). This re-use can be dynamically configured by the base station 412 over time based on the changing locations of the respective vehicles in its service area.

In some examples, the vehicle 400 may further include a V2V transceiver 418, configured for communication with another V2V transceiver 452 on a neighbor vehicle 450 (e.g., a vehicle within the range of the V2V transceiver 422). The V2V transceivers 418 and 452 may exchange vehicle information regarding the position, speed, trajectory, route, braking, acceleration, and other information regarding each of the vehicles 400 and 450 and may further exchange vehicle information received from other neighbor vehicles (not shown). In some examples, the V2V transceiver 418 utilizes dedicated short-range communications (DRSC) with a range of up to three-hundred meters. Each vehicle 400 may provide vehicle information for its own vehicle (e.g., as obtained from internal sensors, gauges, and systems), and for neighbor vehicles (e.g., as obtained via the V2V transceiver 418) to the base station 412 for use in allocating backhaul and access interface resources.

Following the reception of the allocated resources for the backhaul and access links, the vehicle 400 may facilitate commencement of communication between the UEs 406 in its passenger cabin and the base station 412. Additionally, the vehicle 400 may perform power control of the access link based, at least in part, on the allocation received from the base station 412, and/or the dynamic environment of the access link, as described above.

Figure 5:
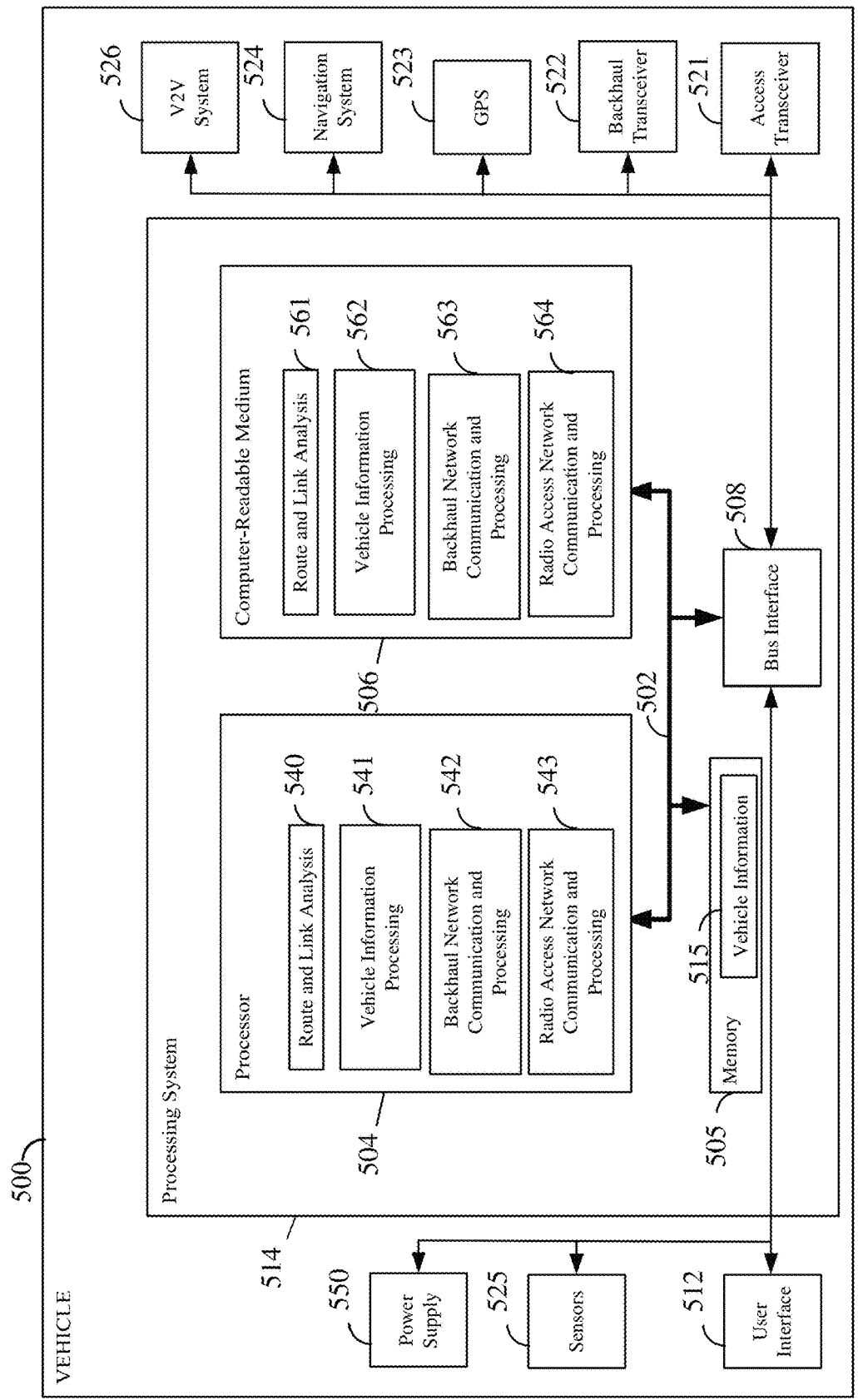
FIG. 5 is a block diagram illustrating an example of a hardware implementation for a vehicle employing a processing system, according to some aspects of the present disclosure.

FIG. 5 is a simplified block diagram illustrating an example of a hardware implementation for a vehicle 500 employing a processing system 514. For example, the vehicle 500 may be a vehicle 152 as illustrated in FIG. 1; a vehicle 400 as illustrated in FIG. 4; a scheduling entity 202 as illustrated in FIG. 2; a user equipment (UE) as illustrated in FIG. 1; and/or a scheduled entity 204 as illustrated in FIG. 2.

The vehicle 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the vehicle 500 may be configured to perform any one or more of the functions described herein. That is, the processor 504, as utilized in a vehicle 500, may be used to implement any one or more of the processes described below.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further.

A bus interface 508 provides an interface between the bus 502 and one or more peripherals. For example, peripherals may include an access transceiver 521; a backhaul transceiver 522; positioning device such as a global positioning system (GPS) receiver 523; a navigation system 524; one or more sensors 525; and/or a vehicle-to-vehicle (V2V) communication system 526. In addition, the bus interface 508 provides an interface to a power supply 550 for the various peripherals and the processing system 514.

The access transceiver 521 provides a means for communicating with various other apparatus over a transmission medium, e.g., one or more wireless communication devices, such as user equipment (UE), within a passenger cabin of the vehicle 500. In some examples, the access transceiver 521 is configured to operate with low power (e.g., a lower power than the backhaul transceiver 522) utilizing the power supply 550 or an internal power supply to reduce interference between transmissions within the vehicle 500 and within neighbor vehicles. In addition, the access transceiver 521 may further be configured with a plurality of antennas to enable beamforming or to provide a separate unidirectional antenna for each seat in the passenger cabin to reduce interference between user equipment within the passenger cabin of the vehicle.

The backhaul transceiver 522 provides a means for communicating with various other apparatus within a wireless communication network over a transmission medium, e.g., a remote base station within the wireless communication network. In some examples, the backhaul transceiver 522 is configured to operate with high power (e.g., a higher power than the access transceiver 521) utilizing the power supply 550 or an internal power supply to communicate with the base station. In addition, the backhaul transceiver 522 may include a plurality of antennas to enable beamforming and to support multiple-input-multiple-output (MIMO) communication with the base station. For example, the backhaul transceiver 522 may be configured to simultaneously transmit user data traffic received from two or more scheduled entities (UEs) to the base station via the same time-frequency resources utilizing MIMO. Similarly, the backhaul transceiver 522 may be configured to simultaneously receive, via the backhaul transceiver 522, user data traffic destined for two or more UEs within the vehicle utilizing MIMO.

In some examples, the backhaul transceiver 522 and access transceiver 521 may be configured to utilize the same carrier frequency or different carrier frequencies. For example, the carrier frequency utilized by both the backhaul transceiver 522 and access transceiver 521 may be above 6 GHz. In other examples, the carrier frequency of the backhaul transceiver 522 may be above 6 GHz, while the carrier frequency of the access transceiver 521 is below 6 GHz (e.g., a sub-6 GHz carrier frequency). However, it should be understood that any suitable carrier frequency and communication protocol may be utilized by the backhaul transceiver 522 and access transceiver 521.

In addition, the backhaul transceiver 522 and access transceiver 521 may further be configured to utilize the same time-frequency resources within the same carrier frequency for communication with both the base station and the wireless communication devices within the passenger cabin. To enable the backhaul transceiver 522 and access transceiver 521 to utilize the same carrier frequency (and possibly the same time-frequency resources), the backhaul transceiver 522 may be shielded from the access transceiver 521. For example, the antenna(s) of the backhaul transceiver 522 may be configured externally on a roof of the vehicle, while the antenna(s) of the access transceiver 521 may be configured within the passenger cabin of the vehicle and/or under the roof of the vehicle.

In the example illustrated in FIG. 5, both the access transceiver and the backhaul transceiver are illustrated under the control of a single processing system 514. However, it is to be understood that this is not necessarily the case, and in other examples, the backhaul transceiver and the access transceiver may be under the control of separate processing systems. Accordingly, the processing system 514 illustrated in FIG. 5 is to be understood as a schematic representation of one or more physical processing systems 514 configured to cooperatively manage the access transceiver and backhaul transceiver.

The GPS receiver 523, navigation system 524, sensors 525, and/or V2V communication system 526 may be configured to obtain vehicle information 515 regarding the vehicle 500 and/or one or more neighbor vehicles (e.g., vehicles within a range of the V2V communication system 526). In some examples, the vehicle information 515 may include one or more of a position (e.g., coordinates) of the vehicle and/or neighbor vehicle(s), a speed of the vehicle and/or neighbor vehicle(s), a trajectory of the vehicle and/or neighbor vehicle(s), or a route of the vehicle and/or neighbor vehicle(s). In addition, the vehicle information 515 may include a set of one or more parameters of an environment in the passenger cabin that affects performance of the access transceiver 521. For example, the vehicle information 515 may include an estimated leakage footprint of the vehicle based on which parts of the vehicle are currently open (e.g., a door, window, etc.). The vehicle information 515 may be maintained, for example, within memory 505 and may further be transmitted to a base station in wireless communication with the vehicle 500 via the backhaul transceiver 522.

The GPS receiver 523 provides a means for communicating with a plurality of GPS satellites and determining position, speed, and trajectory information of the vehicle 500. The navigation system 524 provides a means for mapping or planning a route to one or more destinations for the vehicle 500. In the illustrated example, the navigation system 524 is illustrated external to the processing system 514; however, in another example, the navigation system 524 may be internal to the processing system 514, e.g., operational by the processor 504 utilizing software stored on the computer-readable medium 506. The one or more sensors 525 may include any suitable set of one or more sensors, including, for example, but not limited to, an image sensor or camera, a Radar, a Lidar, etc. In addition, the set of one or more sensors 525 may further include sensors for determining whether a window, door, sunroof, hatchback, convertible top, or other openable part of the vehicle is open. The set of sensors 525 may further include sensors to determine whether the vehicle is braking or accelerating. The set of sensors 525 may further include other types of gauges in the vehicle 500, such as a speedometer.

The V2V communication system 526 operates in coordination with the one or more sensors 525, navigation system 524, and GPS receiver 523 to obtain information regarding the position of the vehicle, the speed of the vehicle, the trajectory, and/or the route of the vehicle and to communicate the information to neighbor vehicles. In addition, the V2V system 526 may receive information regarding the position, speed, trajectory and/or route of neighbor vehicles. The V2V system 526 may further communicate other information received from the sensors 525 and/or receive other information from neighbor vehicles, such as whether the vehicle or neighbor vehicle is braking or accelerating. In some examples, the V2V system 526 utilizes dedicated short-range communications (DRSC) with a range of up to three-hundred meters. The vehicle 500 further includes a user interface (e.g., keypad, display, speaker, microphone, control knobs, etc.) for enabling a passenger or user in the passenger cabin to interact with the system described herein below.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506.

The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include route and link analysis circuitry 541 configured for determining and analyzing a route of the vehicle 500 (e.g., in cooperation with the navigation system 524) and/or neighbor vehicle(s) (e.g., in cooperation with the V2V communication system 525). The route and link analysis circuitry 541 may further be configured to store the route of the vehicle and/or neighbor vehicle(s) within memory 505. The route and link analysis circuitry 541 may further operate in coordination with route and link analysis software 561.

The processor 504 may further include vehicle information processing circuitry 542 configured for collecting, processing, and storing vehicle information 515 from one or more of the GPS receiver 523, navigation system 524, sensors 525, or V2V system 526. In some examples, the vehicle information may include a position, speed, trajectory and/or route of the vehicle and/or neighbor vehicle(s). The vehicle information 515 may further include a set of one or more parameters of an environment in the passenger cabin that affects performance of the access transceiver 521. For example, the vehicle information 515 may include an indication of which parts of the vehicle are currently open. In addition, the vehicle information processing circuitry 542 may further be configured to calculate an estimated leakage footprint of the vehicle based on which parts of the vehicle are currently open (e.g., a door, window, etc.) and store the estimated leakage footprint in the vehicle information. The vehicle information processing circuitry 542 may further operate in coordination with vehicle information processing software 562.

The processor 504 may further include backhaul network communication and processing circuitry 543 configured for communicating via a backhaul link (e.g., in cooperation with the backhaul transceiver 522). In some examples, the backhaul network communication and processing circuitry 543 may include one or more hardware components that provide the physical structure that performs processes related to wireless communication (e.g., signal reception and/or signal transmission) and signal processing (e.g., processing a received signal and/or processing a signal for transmission). In addition, the backhaul network communication and processing circuitry 543 may further be configured to access the vehicle information 515 and transmit the vehicle information to the base station periodically or in response to a request for the vehicle information via the backhaul transceiver 522. The backhaul network communication and processing circuitry 543 may further operate in coordination with backhaul network communication and processing software 563.

The processor 504 may further include radio access network communication and processing circuitry 544 configured for communicating with one or more wireless communication devices within the passenger cabin of the vehicle via an access link (e.g., in cooperation with the access transceiver 521). In some examples, the radio access network communication and processing circuitry 544 may include one or more hardware components that provide the physical structure that performs processes related to wireless communication (e.g., signal reception and/or signal transmission) and signal processing (e.g., processing a received signal and/or processing a signal for transmission). The radio access network communication and processing circuitry 544 may further operate in coordination with radio access network communication and processing software 364. In addition, the backhaul network communication and processing circuitry 543 may be configured to operate in coordination with the radio access network communication and processing circuitry 544 to establish connectivity between the one or more wireless communication devices in the passenger cabin of the vehicle and the wireless communication network via the access transceiver 521 and the backhaul transceiver 522.

Figure 6:
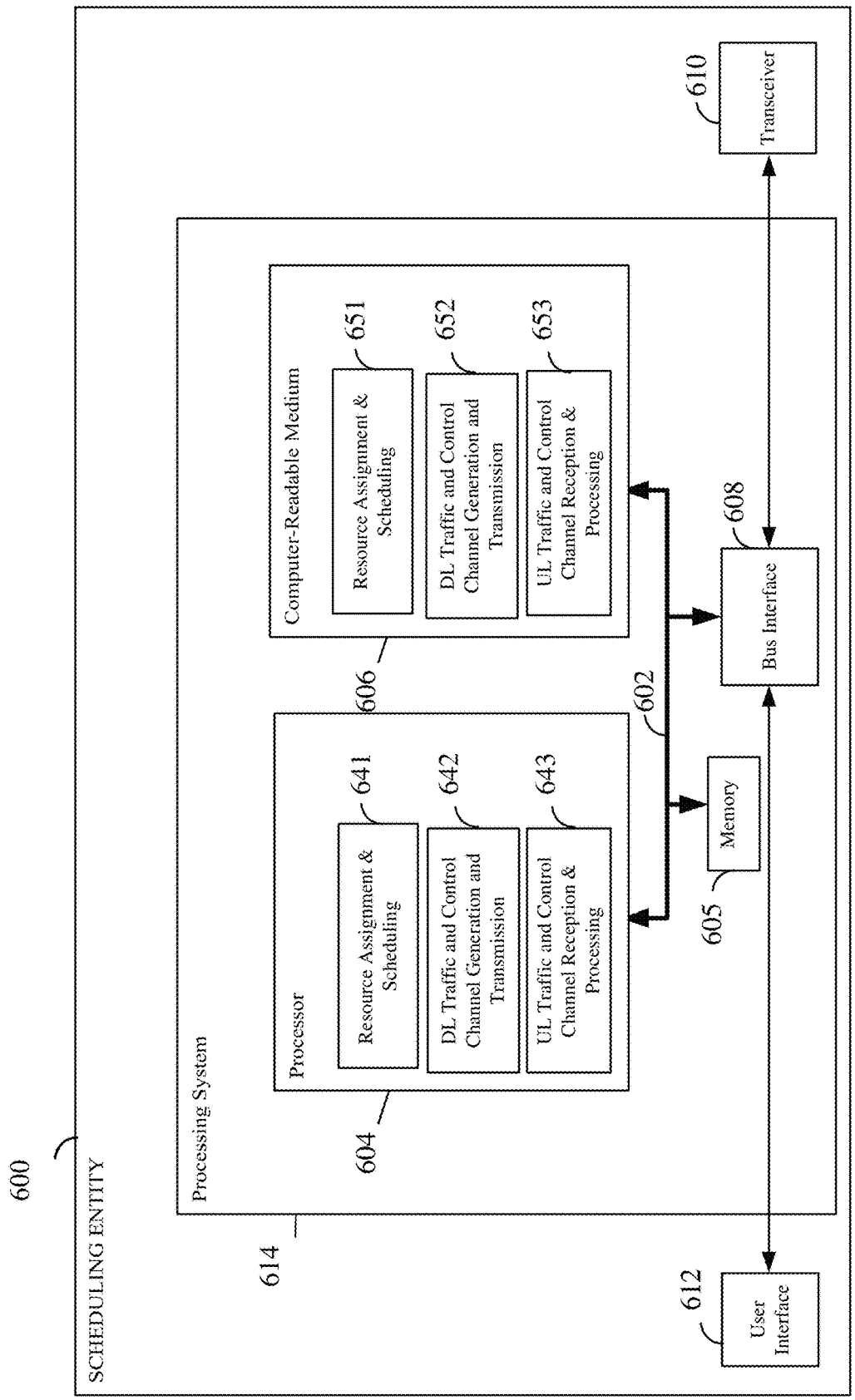
FIG. 6 is a block diagram illustrating an example of a hardware implementation for a scheduling entity employing a processing system, according to some aspects of the present disclosure.

FIG. 6 is a conceptual diagram illustrating an example of a hardware implementation for an exemplary scheduling entity 600 employing a processing system 614. For example, the scheduling entity 600 may be a next generation (5G) base station as illustrated in any one or more of FIG. 1, 2 or 4. In another example, the scheduling entity 600 may be a user equipment (UE) as illustrated in any one or more of FIGS. 1 and 2.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes described below.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium (e.g., air interface). Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606.

The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include resource assignment and scheduling circuitry 641, configured to generate, schedule, and modify a resource assignment or grant of time-frequency resources (e.g., a set of one or more resource elements, where each resource element corresponding to one subcarrier frequency and one OFDM symbol). For example, the resource assignment and scheduling circuitry 641 may schedule time-frequency resources within a plurality of time division duplex (TDD) and/or frequency division duplex (FDD) subframes, slots, and/or mini-slots to carry user data traffic and/or control information to and/or from multiple UEs (scheduled entities).

In various aspects of the disclosure, the resource assignment and scheduling circuitry 641 may be configured to schedule backhaul and access link resources (e.g., time-frequency resources) for one or more vehicles and one or more scheduled entities (UEs) within the one or more vehicles. In particular, the resource assignment and scheduling circuitry 641 may assign downlink and/or uplink backhaul and access link resources to a vehicle based on a request for the resources received from the vehicle. In some examples, the downlink and uplink backhaul and access link resources may be assigned based on various vehicle information related to one or more of the vehicles for which resources have been assigned or requested. For example, the vehicle information may include a position, speed, trajectory and/or route of both the vehicle and one or more neighbor vehicles and/or may include a set of one or more parameters of an environment in the passenger cabin of the vehicle and/or one or more neighbor vehicles.

The vehicle information may be utilized by the resource assignment and scheduling circuitry 641 to enable the access link resources to be re-used between vehicles (e.g., as access link resources for the vehicle and either backhaul or access link resources for another vehicle within the cell served by the scheduling entity). In particular, the resource assignment and scheduling circuitry 641 may utilize the vehicle information to ensure that the interference between vehicles/UEs that may be assigned the same time-frequency resources is not too high. For example, if the resource assignment and scheduling circuitry 641 determines that the interference between neighbor vehicles assigned the same time-frequency resources would be above a threshold, the resource assignment and scheduling circuitry 641 may assign different time-frequency resources to each of the vehicles (e.g., the access link resources assigned to the vehicle may include different time-frequency resources than the backhaul and access link time-frequency resources assigned to a neighbor vehicle).

In some examples, the resource assignment and scheduling circuitry 641 may assign the backhaul and access link resources to a vehicle utilizing the RNTI of the vehicle. In this example, the access link resources may be assigned to the vehicle for use by the vehicle in scheduling access link transmissions between the vehicle and one or more UEs within the vehicle. In other examples, the resource assignment and scheduling circuitry 641 may assign the backhaul link resources to the vehicle utilizing the RNTI of the vehicle and the access link resources to the vehicle utilizing the RNTI of a particular UE within the vehicle. In this example, the access link resources may be assigned to the vehicle for use by the vehicle in communicating with the particular UE.

For example, the resource assignment and scheduling circuitry 641 may assign a first set of downlink and/or uplink time-frequency resources for the backhaul link and a second set of downlink and/or uplink time-frequency resources for the access link. In some examples, the first and second sets of time-frequency resources are the same or overlapping. In addition, each set of time-frequency resources may include resources for both control information (e.g., downlink control information (DCI) within a PDCCH and/or uplink control information (UCI) within a PUCCH) and user data traffic (e.g., PDSCH and/or PUSCH). The resource assignment and scheduling circuitry 641 may further operate in coordination with resource assignment and scheduling software 651.

The processor 604 may further include downlink (DL) traffic and control channel generation and transmission circuitry 642, configured to generate and transmit downlink user data traffic and control channels within one or more subframes, slots, and/or mini-slots. The DL traffic and control channel generation and transmission circuitry 642 may operate in coordination with the resource assignment and scheduling circuitry 641 to place the DL user data traffic and/or control information onto a time division duplex (TDD) or frequency division duplex (FDD) carrier by including the DL user data traffic and/or control information within one or more subframes, slots, and/or mini-slots in accordance with the resources assigned to the DL user data traffic and/or control information.

For example, the DL traffic and control channel generation and transmission circuitry 642 may be configured to generate a physical downlink control channel (PDCCH) (or Enhanced PDCCH (ePDCCH)) including downlink control information (DCI). In some examples, one or more of the PDCCHs may include DCI providing a downlink assignment or uplink grant of time-frequency resources for both a backhaul link and an access link of a vehicle. For example, a PDCCH may include separate DCI for the backhaul link and access link (e.g., when different time-frequency resources are allocated to the backhaul and access links or when the same time-frequency resources are allocated, but each are separately indicated). As another example, a PDCCH may include a single DCI including both the backhaul link and access link assignment/grant (e.g., when the same time-frequency resources are allocated the backhaul and access links). As another example, separate PDCCH's may be transmitted, each including one of the backhaul link assignment/grant or access link assignment/grant. In addition, each PDCCH may be scrambled with the RNTI of the vehicle or the RNTI of a UE within the vehicle, as described above.

The DL traffic and control channel generation and transmission circuitry 642 may further be configured to generate a physical downlink shared channel (PDSCH) (or Enhanced PDSCH (ePDSCH)) including downlink user data traffic. For example, the PDSCH may include user data traffic for one or more UEs within a passenger cabin of a vehicle. In some examples, multiple PDSCH (each including user data traffic for a particular UE) may be transmitted to a vehicle via the same time-frequency resources utilizing multiple-input-multiple output (MIMO) beamforming. In addition, the vehicle information related to the vehicle may further be used to assist a beamforming operation of the backhaul link, such that the DL traffic and control channel generation and transmission circuitry 642 may direct a beam for the backhaul link to the vehicle dynamically as the vehicle moves. The DL traffic and control channel generation and transmission circuitry 642 may further operate in coordination with DL traffic and control channel generation and transmission software 652.

The processor 604 may further include uplink (UL) traffic and control channel reception and processing circuitry 643, configured to receive and process uplink control channels and uplink traffic channels from one or more scheduled entities. For example, the UL traffic and control channel reception and processing circuitry 643 may be configured to receive uplink user data traffic from one or more scheduled entities. In addition, the UL traffic and control channel reception and processing circuitry 643 may operate in coordination with the resource assignment and scheduling circuitry 641 to schedule UL user data traffic transmissions, DL user data traffic transmissions and/or DL user data traffic retransmissions in accordance with the received uplink control information.

In various aspects of the present disclosure, the UL traffic and control channel reception and processing circuitry 643 may be configured to receive a request for backhaul and access link resources from a vehicle. The request may be received, for example, as a scheduling request (e.g., within UCI of a PUCCH), random access request, or other suitable request. In some examples, the request may include the RNTI of the vehicle and/or the RNTI of a particular UE within the vehicle. The UL traffic and control channel reception and processing circuitry 643 may further be configured to receive uplink user data traffic (e.g., PUSCH) from the vehicle. The uplink user data traffic may include user data traffic from one or more UEs within the vehicle. In some examples, two or more PUSCH (each containing user data traffic from one of the UEs in the vehicle) may be received on the same time-frequency resources utilizing MIMO. The UL traffic and control channel reception and processing circuitry 643 may further operate in coordination with UL traffic and control channel reception and processing software 653.

Figure 7:
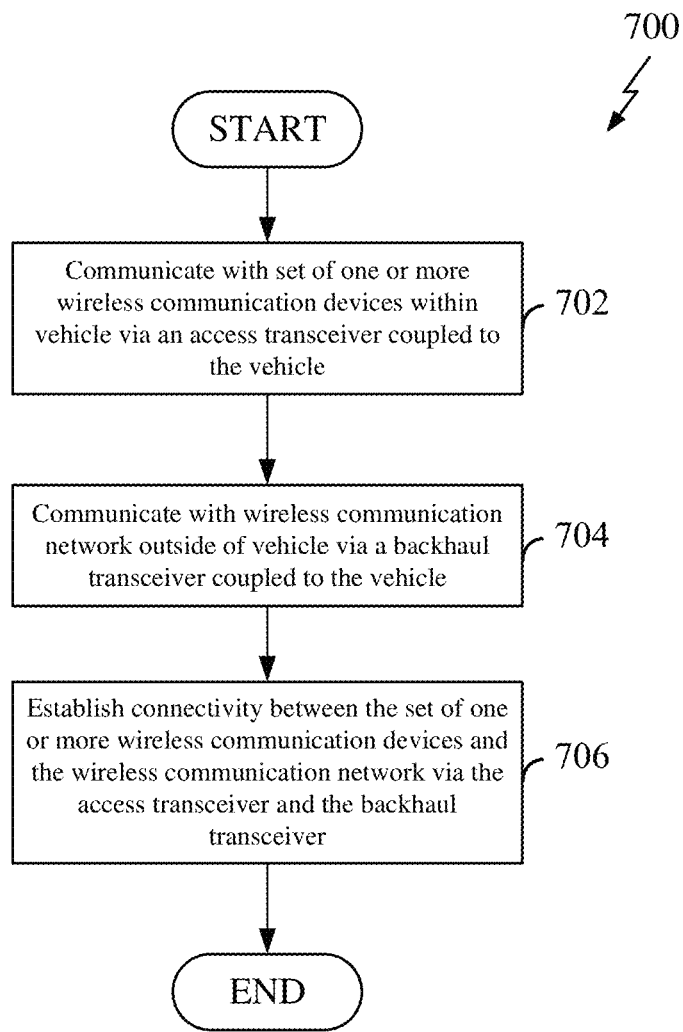
FIG. 7 is a flow chart illustrating an exemplary process for wireless communication with a vehicle acting as a base station according to some aspects of the present disclosure.

FIG. 7 is a flow chart illustrating an exemplary process 700 for wireless communication with a vehicle (e.g., vehicle 400 or 500) acting as a small cell or IAB node. As described below, some or all illustrated features may be omitted in a particular implementation within the scope of the present disclosure, and some illustrated features may not be required for implementation of all embodiments. In some examples, the process 700 may be carried out by the vehicle 400 illustrated in FIG. 4. In some examples, the process 700 may be carried out by the vehicle 500 illustrated in FIG. 5, as described below. In some examples, the process 700 may be carried out by any suitable apparatus or means for carrying out the functions or algorithm described below.

At block 702, the vehicle 500 may communicate with a set of one or more wireless communication devices (e.g., UEs) within a passenger cabin of a vehicle via an access transceiver coupled to the vehicle. In some examples, the access transceiver may be configured on an interior surface of the roof of the vehicle. In addition, the access transceiver may include a set of one or more antennas. The vehicle may facilitate communication with the UEs by acting as a small cell or IAB node. For example, the access transceiver 521 in combination with the radio access network communication and processing circuitry 544 shown and described above in reference to FIG. 5 may enable communication between the vehicle 500 and the set of UEs.

At block 704, the vehicle 500 may communicate with a wireless communication network outside of the passenger cabin of the vehicle via a backhaul transceiver coupled the vehicle. In some examples, the backhaul transceiver may be configured on an exterior surface of the roof of the vehicle. In addition, the backhaul transceiver may include a set of one or more antennas. The vehicle may facilitate communication with a base station within the wireless communication network by acting as an IAB node or a UE towards the base station. For example, the backhaul transceiver 522 in combination with the backhaul network communication and processing circuitry 543 shown and described above in reference to FIG. 5 may enable communication between the vehicle 500 and the base station.

At block 706, the vehicle 500 may establish connectivity between the set of one or more wireless communication devices and the wireless communication network via the access transceiver and the backhaul transceiver. For example, the radio access network communication and processing circuitry 544 shown and described above in reference to FIG. 5 may operate together with the backhaul network communication and processing circuitry 543 shown and described above in reference to FIG. 5 to enable communication between the access transceiver 521 and the backhaul transceiver 522.

Figure 8:
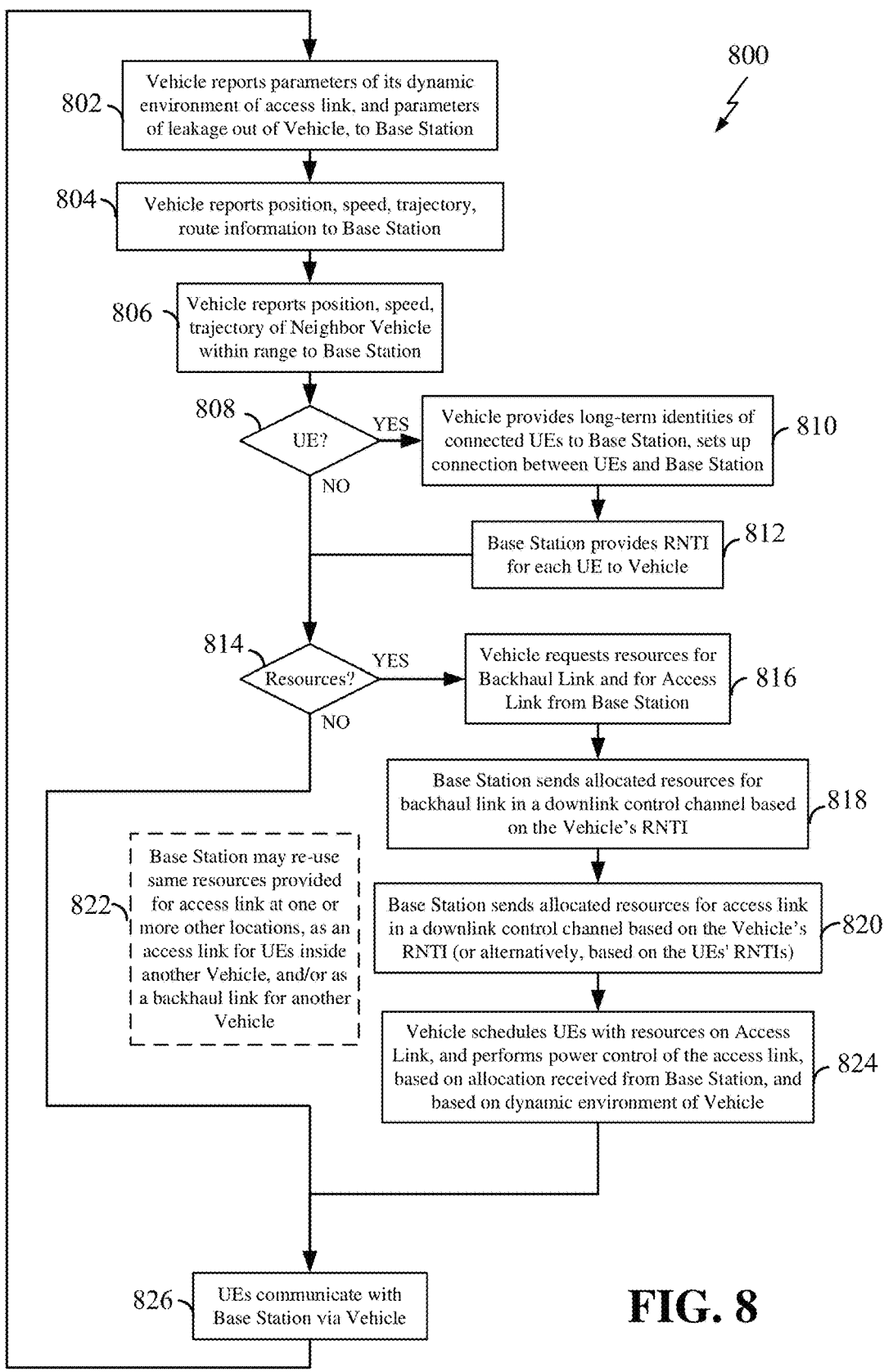
FIG. 8 is a flow chart illustrating another exemplary process for wireless communication with a vehicle acting as a base station according to some aspects of the present disclosure.

FIG. 8 is a flow chart illustrating an exemplary process 800 for wireless communication with a vehicle (e.g., vehicle 400 or 500) acting as a small cell or IAB node. As described below, some or all illustrated features may be omitted in a particular implementation within the scope of the present disclosure, and some illustrated features may not be required for implementation of all embodiments. In some examples, the process 800 may be carried out by the vehicle 400 illustrated in FIG. 4, as described below. In some examples, the process 800 may be carried out by the vehicle 500 illustrated in FIG. 5. In some examples, the process 800 may be carried out by any suitable apparatus or means for carrying out the functions or algorithm described below.

In this flow chart, blocks 802, 804, and 806 are illustrated in a sequence, and are shown to occur first, before the rest of the process. However, it is to be understood that this is merely one example, and that each of these three blocks may occur periodically, intermittently, in response to a trigger event, or at any suitable time. Moreover, each of these blocks may occur at the same time, or at different times from one another (e.g., with different periodicities or in response to different triggers).

At block 802, the vehicle 400 may report one or more parameters corresponding to a dynamic environment of an access link corresponding to its access transceiver 421. Parameters corresponding to the dynamic environment may include the location of UEs in the cabin, the status of the windows, sunroof or moon roof, or convertible top being up or down, which can affect the amount of interference that UEs in the cabin cause outside the vehicle, or other suitable parameters. The vehicle 400 may additionally report an estimated leakage footprint out of the vehicle 400.

At block 804, the vehicle 400 may report vehicle information relating to its own position, speed, or trajectory, and if available, information about its planned route, to the base station. In some examples, this vehicle information may be obtained by the vehicle 400 employing a global positioning system (GPS) unit. In some examples, GPS data may be supplemented with or substituted by other sources of information, including but not limited to a speedometer in the vehicle 400. In addition, the planned route of the vehicle 400 may be provided by a suitable navigation system employed by the vehicle 400. This vehicle information can assist a beamforming operation of the backhaul link, such that the base station 412 may direct a beam for the backhaul link to the vehicle 400 dynamically as the vehicle moves.

At block 806, the vehicle 400 may report vehicle information relating to the position, speed, or trajectory of one or more neighbor vehicles within a suitable range (e.g., a predetermined range) of the vehicle 400. The vehicle information about neighboring vehicles may be obtained in any suitable manner. As one example, the vehicle 400 may employ one or more sensors for detecting the parameters of the neighbor vehicle, such as an image sensor or camera, or a ranging sensor (e.g., Radar and/or Lidar). In another example, the vehicle 400 may receive information from a neighbor vehicle via any suitable communication link, including but not limited to a V2V communication link. This information can assist the base station 412 or its corresponding wireless communication network to be better informed about potential interference that use of the access interface within the vehicle 400 might cause.

At block 808, the vehicle 400 may determine whether one or more new UEs are to utilize the access interface to connect to the base station 412. If yes, then the process may proceed to block 810. At block 810, the vehicle 400 may provide an identity of the one or more UEs connected to the access interface to the base station 412, and may set up or establish a connection between the one or more UEs and the base station 412 via the access interface and the backhaul interface. At block 812, the base station 412 may provide a radio network temporary identifier (RNTI) for each of the one or more UEs to the vehicle 400.

Following block 812, or if at block 808 the vehicle 400 did not have new UEs to set up, the process may proceed to block 814. At block 814, the vehicle 400 may determine whether there is a need for wireless resources for the access network and/or for the backhaul network. Such a need for resources may arise when a UE indicates a request to initiate a new call or data session, to increase its usage corresponding to an existing call or data session, or for any other suitable reason. If such a need arises, the process may proceed to block 816. At block 816, the vehicle 400 may transmit a request for resources for the access link and/or for the backhaul link from the base station 412. The request may be transmitted via the backhaul interface, and may include suitable control signaling including, but not limited to, a scheduling request.

At block 818, the vehicle 400 may receive information indicating resources allocated for the backhaul interface from the base station 412. The information may be carried in a downlink control channel, configured to be received by the vehicle 400. For example, the information may be addressed to the vehicle 300 based on the RNTI of the vehicle 300.

At block 820, the vehicle 400 may receive information indicating resources allocated for the access interface from the base station 412. The information may similarly be carried in a downlink control channel. In some examples, the downlink control channel may be directed based on the RNTI of the vehicle 400. Here, the control information indicating the allocation of resources may include any suitable information identifying one or more UEs in the passenger cabin of the vehicle 400. In another example, the resource allocation may at least in part be addressed directly to one or more UEs in the passenger cabin of the vehicle 400 based on the RNTI of that UE. Separate from the process at the vehicle 400, FIG. 8 further illustrates, at block 822, that this configuration can provide for an efficient use of wireless resources. That is, even though at block 820 the base station 412 allocated a given set of resources for the access link at the vehicle 400, according to an aspect of the present disclosure, the base station may re-use those same resources at one or more other locations. At those other locations, those same resources may be operable as an access link for UEs inside another vehicle, and/or as a backhaul link for another vehicle. In some examples, more than one re-use may be performed by the base station 412, e.g., three or four access links and one backhaul link all using the same resources.

Referring back to blocks 802, 804, and 806, as indicated above, the base station 412 may be aware of the location, speed, trajectory, and planned route of the vehicle 400 as well as a set of one or more other vehicles. Furthermore, the base station 412 may be aware of the dynamic environment of the access link, such as a condition where all the windows are rolled down in the vehicle 400, which may increase the amount of interference caused by UEs in the passenger cabin of the vehicle 400. Here, if this amount of interference is high, the base station 412 can determine not to re-use the resources utilized by the access link in that vehicle 400, or only to re-use those resources at a suitable distance from the vehicle 400. This re-use can be dynamically configured, over time, as these reports in blocks 802, 804, and 806 inform the base station 412 of the changing locations of the respective vehicles in its service area.

Following the reception of the allocated resources for the backhaul and access links, at block 824, the vehicle 400 may schedule UEs within its passenger compartment with resources on the access link. These resources may be among the set of resources provided to the vehicle 400 by the base station 412. Additionally, the vehicle 400 may perform power control of the access link. Both the allocation of resources and the power control may be based, at least in part, on the allocation received from the base station 412, and/or the dynamic environment of the access link, as described above.

At block 826, the vehicle 400 may facilitate the commencement of communication between the UEs in its passenger cabin and the base station 412, e.g., as a small cell or IAB node in the wireless access network.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-6 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication in a wireless communication network, the method comprising:
    transmitting, from a vehicle, a request for wireless resources to the wireless communication network via a backhaul transceiver coupled to the vehicle and in wireless communication with the wireless communication network;
    receiving, at the vehicle, an allocation of the wireless resources from the wireless communication network via the backhaul transceiver, wherein the wireless resources comprise backhaul resources and access interface resources;
    communicating with a set of one or more wireless communication devices within a passenger cabin of the vehicle via an access transceiver coupled to the vehicle utilizing the access interface resources;
    determining the access interface resources from among the allocation of the wireless resources for a user equipment (UE) among the set of one or more wireless communication devices;
    transmitting scheduling information based on the access interface resources to the UE via the access transceiver;
    communicating with the wireless communication network outside the passenger cabin of the vehicle via the backhaul transceiver coupled to the vehicle utilizing the backhaul resources; and
    establishing connectivity between the set of one or more wireless communication devices and the wireless communication network via the access transceiver and the backhaul transceiver.

2. The method of claim 1, further comprising:
    determining a position of the vehicle, a speed of the vehicle, and a trajectory of the vehicle;
    determining a planned route of the vehicle;
    transmitting vehicle information about the position, the speed, the trajectory, and the planned route of the vehicle to the wireless communication network via the backhaul transceiver; and
    receiving the allocation of the wireless resources based in part on the position, the speed, the trajectory, and the planned route of the vehicle.

3. The method of claim 1, further comprising:
    determining a position of a neighbor vehicle, a speed of the neighbor vehicle, and a trajectory of the neighbor vehicle;
    transmitting neighbor vehicle information about the position, the speed, and the trajectory of the neighbor vehicle to the wireless communication network via the backhaul transceiver; and
    receiving the allocation of the wireless resources based in part on the position, the speed, and the trajectory of the neighbor vehicle.

4. The method of claim 1, further comprising:
    determining a set of one or more parameters of an environment in the passenger cabin that affects performance of the access transceiver;
    transmitting vehicle information about the set of one or more parameters to the wireless communication network via the backhaul transceiver; and
    receiving the allocation of the wireless resources based in part on the set of one or more parameters.

5. The method of claim 1, further comprising:
determining an identity of a user equipment (UE) among the set of one or more wireless communication devices;
transmitting identity information about the identity of the UE to the wireless communication network via the backhaul transceiver;
receiving a radio network temporary identifier (RNTI) for the UE from the wireless communication network via the backhaul transceiver; and
transmitting the RNTI to the UE via the access transceiver.

6. The method of claim 1, wherein:
the access transceiver is configured to communicate with the UE utilizing the access interface resources.

7. The method of claim 6, wherein the access interface resources and the backhaul resources comprise a same carrier frequency.

8. The method of claim 6, wherein the access interface resources and the backhaul resources comprise carrier frequencies above 6 Gigahertz (GHz).

9. The method of claim 1, further comprising:
transmitting the request for the wireless resources utilizing a radio network temporary identifier (RNTI) of the vehicle;
receiving the allocation of the wireless resources for the RNTI of the vehicle; and
scheduling the access interface resources within the allocation of the wireless resources for the UE.

10. The method of claim 1, further comprising:
transmitting the request for the wireless resources utilizing at least a radio network temporary identifier (RNTI) of the UE; and
receiving the access interface resources for the RNTI of the UE.

11. The method of claim 1, wherein the access interface resources are simultaneously allocated to another vehicle within the wireless communication network.

12. The method of claim 1, wherein the backhaul transceiver is configured for wireless communication at a higher power than the access transceiver.

13. An apparatus coupled to a vehicle and configured to act as a base station in a wireless communication network, the apparatus comprising:
a processor;
an access transceiver communicatively coupled to the processor, and configured for wireless communication with a set of one or more wireless communication devices within a passenger cabin of the vehicle utilizing access interface resources; and
a backhaul transceiver communicatively coupled to the processor, and configured for wireless communication with the wireless communication network outside the passenger cabin of the vehicle utilizing backhaul resources,
wherein the processor is configured to:
transmit a request for wireless resources to the wireless communication network via the backhaul transceiver;
receive an allocation of the wireless resources from the wireless communication network via the backhaul transceiver, wherein the wireless resources comprise the backhaul resources and the access interface resources;
determine the access interface resources from among the allocation of the wireless resources for a user equipment (UE) among the set of one or more wireless communication devices;
transmit scheduling information based on the access interface resources to the UE via the access transceiver; and
establish connectivity between the set of one or more wireless communication devices and the wireless communication network via the access transceiver and the backhaul transceiver.

14. The apparatus of claim 13, further comprising:
a positioning device communicatively coupled to the processor; and
a navigation device communicatively coupled to the processor,
wherein the processor is further configured to:
determine a position of the vehicle, a speed of the vehicle, and a trajectory of the vehicle utilizing the positioning device;
determine a planned route of the vehicle utilizing the navigation device;
transmit vehicle information about the position, the speed, the trajectory, and the planned route of the vehicle to the wireless communication network via the backhaul transceiver; and
receive the allocation of the wireless resources based in part on the position, the speed, the trajectory, and the planned route of the vehicle.

15. The apparatus of claim 13, further comprising:
a set of one or more sensors,
wherein the processor is further configured to:
determine a position of a neighbor vehicle, a speed of the neighbor vehicle, and a trajectory of the neighbor vehicle utilizing the set of one or more sensors;
transmit neighbor vehicle information about the position, the speed, and the trajectory of the neighbor vehicle to the wireless communication network via the backhaul transceiver; and
receive the allocation of the wireless resources based in part on the position, the speed, and the trajectory of the neighbor vehicle.

16. The apparatus of claim 13, further comprising:
a vehicle-to-vehicle (V2V) communication system,
wherein the processor is further configured to:
determine a position of a neighbor vehicle, a speed of the neighbor vehicle, and a trajectory of the neighbor vehicle utilizing the V2V communication system;
transmit neighbor vehicle information about the position, the speed, and the trajectory of the neighbor vehicle to the wireless communication network via the backhaul transceiver; and
receive the allocation of the wireless resources based in part on the position, the speed, and the trajectory of the neighbor vehicle.

17. The apparatus of claim 13, wherein the processor is further configured to:
determine a set of one or more parameters of an environment in the passenger cabin that affects performance of the access transceiver;
transmit vehicle information about the set of one or more parameters to the wireless communication network via the backhaul transceiver; and
receive the allocation of the wireless resources based in part on the set of one or more parameters.

18. The apparatus of claim 13, wherein the processor is further configured to:
determine an identity of a user equipment (UE) among the set of one or more wireless communication devices;

transmit identity information about the identity of the UE to the wireless communication network via the backhaul transceiver;
receive a radio network temporary identifier (RNTI) for the UE from the wireless communication network via the backhaul transceiver; and
transmit the RNTI to the UE via the access transceiver.

19. The apparatus of claim 13, wherein the access transceiver is configured to communicate with the UE utilizing the access interface resources.

20. The apparatus of claim 13, wherein the processor is further configured to:
transmit the request for the wireless resources utilizing a radio network temporary identifier (RNTI) of the vehicle;
receive the allocation of the wireless resources for the RNTI of the vehicle; and
schedule the access interface resources within the allocation of the wireless resources for the UE.

21. The apparatus of claim 13, wherein the processor is further configured to:
transmit the request for the wireless resources utilizing at least a radio network temporary identifier (RNTI) of the UE; and
receive the access interface resources for the RNTI of the UE.

22. An apparatus in a wireless communication network, the apparatus comprising:
means for transmitting, from a vehicle, a request for wireless resources to the wireless communication network;
means for receiving, at the vehicle, an allocation of the wireless resources from the wireless communication network, wherein the wireless resources comprise backhaul resources and access interface resources;
means for communicating with a set of one or more wireless communication devices within a passenger cabin of a vehicle utilizing the access interface resources;
means for determining the access interface resources from among the allocation of the wireless resources for a user equipment (UE) among the set of one or more wireless communication devices;
means for transmitting scheduling information based on the access interface resources to the UE;
means for communicating with the wireless communication network outside the passenger cabin of the vehicle utilizing the backhaul resources; and
means for establishing connectivity between the set of one or more wireless communication devices and the wireless communication network via the means for communicating with the set of one or more wireless communication devices and the means for communicating with the wireless communication network.

23. The apparatus of claim 22, further comprising:
means for determining a position of the vehicle, a speed of the vehicle, and a trajectory of the vehicle;
means for determining a planned route of the vehicle;
means for transmitting vehicle information about the position, the speed, the trajectory, and the planned route of the vehicle to the wireless communication network; and
means for receiving the allocation of the wireless resources based in part on the position, the speed, the trajectory, and the planned route of the vehicle.

24. The apparatus of claim 22, further comprising:
means for determining a position of a neighbor vehicle, a speed of the neighbor vehicle, and a trajectory of the neighbor vehicle;
means for transmitting neighbor vehicle information about the position, the speed, and the trajectory of the neighbor vehicle to the wireless communication network; and
means for receiving the allocation of the wireless resources based in part on the position, the speed, and the trajectory of the neighbor vehicle.

25. The apparatus of claim 22, further comprising:
means for determining a set of one or more parameters of an environment in the passenger cabin that affects performance of the means for communicating with the set of one or more wireless communication devices;
means for transmitting vehicle information about the set of one or more parameters to the wireless communication network; and
means for receiving the allocation of the wireless resources based in part on the set of one or more parameters.

26. The apparatus of claim 22, further comprising:
means for determining an identity of a user equipment (UE) among the set of one or more wireless communication devices;
means for transmitting identity information about the identity of the UE to the wireless communication network;
means for receiving a radio network temporary identifier (RNTI) for the UE from the wireless communication network; and
means for transmitting the RNTI to the UE.

27. The apparatus of claim 22, further comprising:
means for transmitting the request for the wireless resources utilizing a radio network temporary identifier (RNTI) of the vehicle;
means for receiving the allocation of the wireless resources for the RNTI of the vehicle; and
means for scheduling the access interface resources within the allocation of the wireless resources for the UE.

* * * * *